United States Patent
Hiraku et al.

(10) Patent No.: US 6,712,038 B2
(45) Date of Patent: Mar. 30, 2004

(54) INTAKE DEVICE FOR AN INTERNAL COMBUSTION ENGINE AND METHOD THEREOF

(75) Inventors: Keizo Hiraku, Susono (JP); Toshiki Annoura, Nagoya (JP); Hideki Suzuki, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 10/091,582

(22) Filed: Mar. 7, 2002

(65) Prior Publication Data

US 2002/0129786 A1 Sep. 19, 2002

(30) Foreign Application Priority Data

Mar. 16, 2001 (JP) .......................... 2001-076581

(51) Int. Cl.[7] ............................................... F02B 31/06
(52) U.S. Cl. ........................................ 123/306; 123/336
(58) Field of Search ............................... 123/306, 308, 123/336, 337, 442

(56) References Cited

U.S. PATENT DOCUMENTS

| | | | | |
|---|---|---|---|---|
| 4,462,358 A | * | 7/1984 | Ishida et al. | 123/337 |
| 4,726,341 A | * | 2/1988 | Muranaka et al. | 123/432 |
| 5,273,014 A | * | 12/1993 | Mitobe et al. | 123/336 |
| 5,551,392 A | * | 9/1996 | Yamaji et al. | 123/306 |
| 5,617,824 A | * | 4/1997 | Ohsuga et al. | 123/308 |
| 5,640,941 A | * | 6/1997 | Hazen et al. | 123/306 |
| 5,669,350 A | * | 9/1997 | Altmann et al. | 123/337 |
| 5,720,259 A | * | 2/1998 | Sakurai et al. | 123/432 |
| 5,787,851 A | * | 8/1998 | Sakurai et al. | 123/184.55 |
| 5,852,994 A | * | 12/1998 | Tsuzuku et al. | 123/308 |
| 6,055,958 A | * | 5/2000 | Aoyama et al. | 123/308 |
| 6,155,229 A | * | 12/2000 | Cantrell et al. | 123/336 |
| 6,170,461 B1 | * | 1/2001 | Pursifull | 123/337 |
| 6,176,467 B1 | * | 1/2001 | Yamashita et al. | 251/305 |
| 6,394,066 B1 | * | 5/2002 | Chou et al. | 123/308 |
| 6,543,220 B2 | * | 4/2003 | Yoshida et al. | 60/285 |

FOREIGN PATENT DOCUMENTS

| | | |
|---|---|---|
| JP | A 7-180559 | 7/1995 |
| JP | A 9-4474 | 1/1997 |
| JP | A 2000-179417 | 6/2000 |

* cited by examiner

*Primary Examiner*—Mahmoud Gimie
*Assistant Examiner*—Hai Huynh
(74) *Attorney, Agent, or Firm*—Oliff & Berridge, PLC (57) ABSTRACT

An intake device of an internal combustion engine is provided that includes an intake flow control valve shaped so as to be capable of effectively forming a tumble flow within a combustion chamber when there is a projection within an intake pipe located downstream of the intake flow control valve. The intake device of the internal combustion engine includes an intake flow control valve between a throttle valve provided within an intake pipe and a fuel injector located downstream of the throttle valve, for producing a tumble flow in a combustion chamber. The intake flow control valve includes a valve body. The valve body has a bypass airflow producing portion formed at a position corresponding to that of the fuel injector (i.e., a projection within the intake pipe) when viewed in a flow direction of the airflow. The valve body is shaped to have a projection, thereby allowing an airflow formed by the intake flow control valve to bypass the projection within the intake pipe located downstream of the intake flow control valve.

12 Claims, 8 Drawing Sheets

INTAKE DEVICE FOR AN INTERNAL COMBUSTION ENGINE AND METHOD THEREOF

INCORPORATION BY REFERENCE

The disclosure of Japanese Patent Application No. 2001-076581 filed on Mar. 16, 2001 including the specification, drawings and abstract is incorporated herein by reference in its entirety.

BACKGROUND OF THE INVENTION

1. Field of Invention

The invention relates to an intake device of an internal combustion engine, and more particularly, to an intake device of an internal combustion engine for controlling an intake flow within an intake pipe by means of an intake flow control valve.

2. Description of Related Art

Conventionally, an intake device of an internal combustion engine is known to include an intake flow control valve between a throttle valve within an intake pipe and a fuel injector located downstream of the throttle valve. An example of such an intake device is disclosed in Japanese Patent Application Laid-Open HEI09-4474.

In this intake device, the intake flow control valve is closed from the time when the internal combustion engine is started (e.g., the starter motor is started until the engine speed exceeds a predetermined value), in order to close an intake passage more tightly. Such tight closing of the intake passage produces a large negative pressure within the intake passage downstream of the intake flow control valve. As a result, the fuel injected from a fuel injection valve is atomized so as to facilitate combustion. This intake flow control valve has a hole or notch. The air flow is supplied into a combustion chamber through the hole or notch, thereby forming a stronger tumble flow within the combustion chamber. This enables combustion with a reduced fuel amount, suppressing emission of unburned fuel.

SUMMARY OF THE INVENTION

Various shapes of the intake flow control valve have been proposed. The inventors found that, if there is a projection within the intake pipe located downstream of the intake flow control valve, the intake flow control valve shaped as proposed in the related art may not form a tumble flow within the combustion changer strong enough to effectively improve combustion of the engine. The inventor thus arrived at the invention in order to solve such a problem.

It is an object of the invention to provide an intake device of an internal combustion engine including an intake valve shaped so as to be capable of effectively forming a tumble flow within a combustion chamber even if there is a projection within an intake pipe located downstream of the intake valve.

In order to solve the above problem, an intake device of an internal combustion engine according to one aspect of the invention includes: a throttle valve provided within an intake pipe; a projection within the intake pipe located downstream of the throttle valve; and an intake valve provided between the throttle valve and the projection, for producing a tumble flow in a combustion chamber, in which the intake valve is shaped so that an airflow formed by the intake valve bypasses the projection located downstream of the intake valve.

The intake valve having such a shape allows an airflow formed by the intake valve to bypass the projection within the intake pipe located downstream of the intake valve. Therefore, the airflow is introduced into the combustion chamber without being weaken nor disturbed. This enables formation of an effective tumble flow within the combustion chamber, allowing improved combustion of the internal combustion engine.

DETAILED DESCRIPTION OF PREFERRED EMBODIMENTS

Hereinafter, referring to the drawings as attached, a preferred embodiment of the invention will be described in detail. For easy understanding of the description, the same components are denoted with the same reference numerals and characters throughout the figures, and description thereof is omitted.

Figure 1:
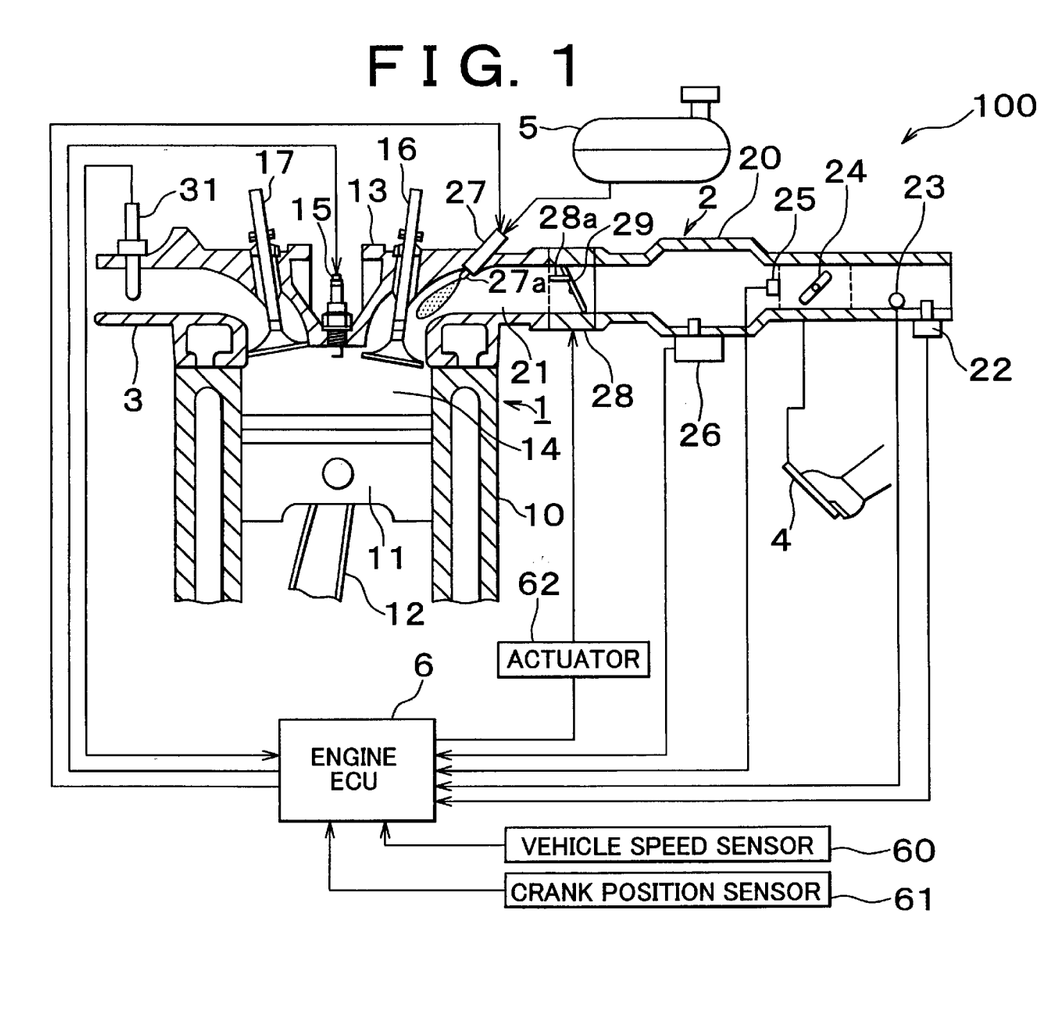
FIG. 1 is a schematic diagram showing an intake device of an internal combustion engine according to the invention and an internal combustion engine applying the same.

FIG. 1 is a schematic diagram showing an intake device 100 of an internal combustion engine according to the invention and an internal combustion engine applying the same.

The internal combustion engine 1 is a spark-ignition, multi-cylinder gasoline internal combustion engine. An intake pipe 2 and an exhaust pipe 3 are connected to the internal combustion engine 1. The intake pipe 2 is provided with an intake temperature sensor 22 for detecting the temperature of an intake air, an airflow meter 23 for detecting the intake air amount, and a throttle valve 24 operating according to operation of an accelerator pedal 4. The intake pipe 2 is also provided with a throttle opening sensor 25 for detecting opening of the throttle valve 24. A surge tank 20 of the intake pipe 2 is provided with an intake pressure sensor 26 for detecting a pressure within the intake pipe 2. An intake port 21 connected to each cylinder of the internal combustion engine 1 is provided with an electromagnetic injector (fuel injector) 27. Fuel (e.g., gasoline) is supplied from a fuel tank 5 into the injector 27.

A fuel injection nozzle at the tip of the injector 27 projects into the intake port 21. When viewed in cross section of the intake port 21, the fuel injection nozzle projects into the intake port 21 from an upper middle position of the intake port 21. The illustrated internal combustion engine 1 is a multi-point injection system including independent injectors 27 for the respective cylinders.

An intake flow control valve assembly 28 including an intake flow control valve 29 is mounted between the surge tank 20 and the intake port 21. The intake flow control valve 29 will be described later in detail.

A piston 11 reciprocates in the vertical direction within a corresponding cylinder 10, as shown in FIG. 1. Each cylinder 10 forms a corresponding cylinder of the internal combustion engine 1. The piston 11 is coupled to a crankshaft (not-shown) through a connecting rod 12. A combustion chamber 14 defined by the cylinder 10 and a cylinder head 13 is formed above the piston 11. A spark plug 15 is mounted at the top of the combustion chamber 14. The spark plug 15 is connected to the intake pipe 2 and the exhaust pipe 3 through an intake valve 16 and an exhaust valve 17, respectively. The intake valve 16 and the exhaust valve 17 are valves capable of being opened and closed.

The exhaust pipe 3 is provided with an air-fuel ratio (A/F) sensor 31 for outputting a prescribed electric signal according to the oxygen concentration in the exhaust gas.

An engine electronic control unit (ECU) 6 for controlling the internal combustion engine 1 is based on a microcomputer. The ECU also controls the intake device 100 of the internal combustion engine 1 according to the invention. In addition to the respective output signals of the sensors described above (e.g., intake temperature sensor 22, airflow meter 23, throttle opening sensor 25, intake pressure sensor 26, A/F sensor 31), the engine ECU 6 receives the respective output signals of a vehicle speed sensor 60 and a crank position sensor 61. The engine ECU 6 controls operation of the spark plugs 15, injectors 27 and an actuator 62.

Figure 2:
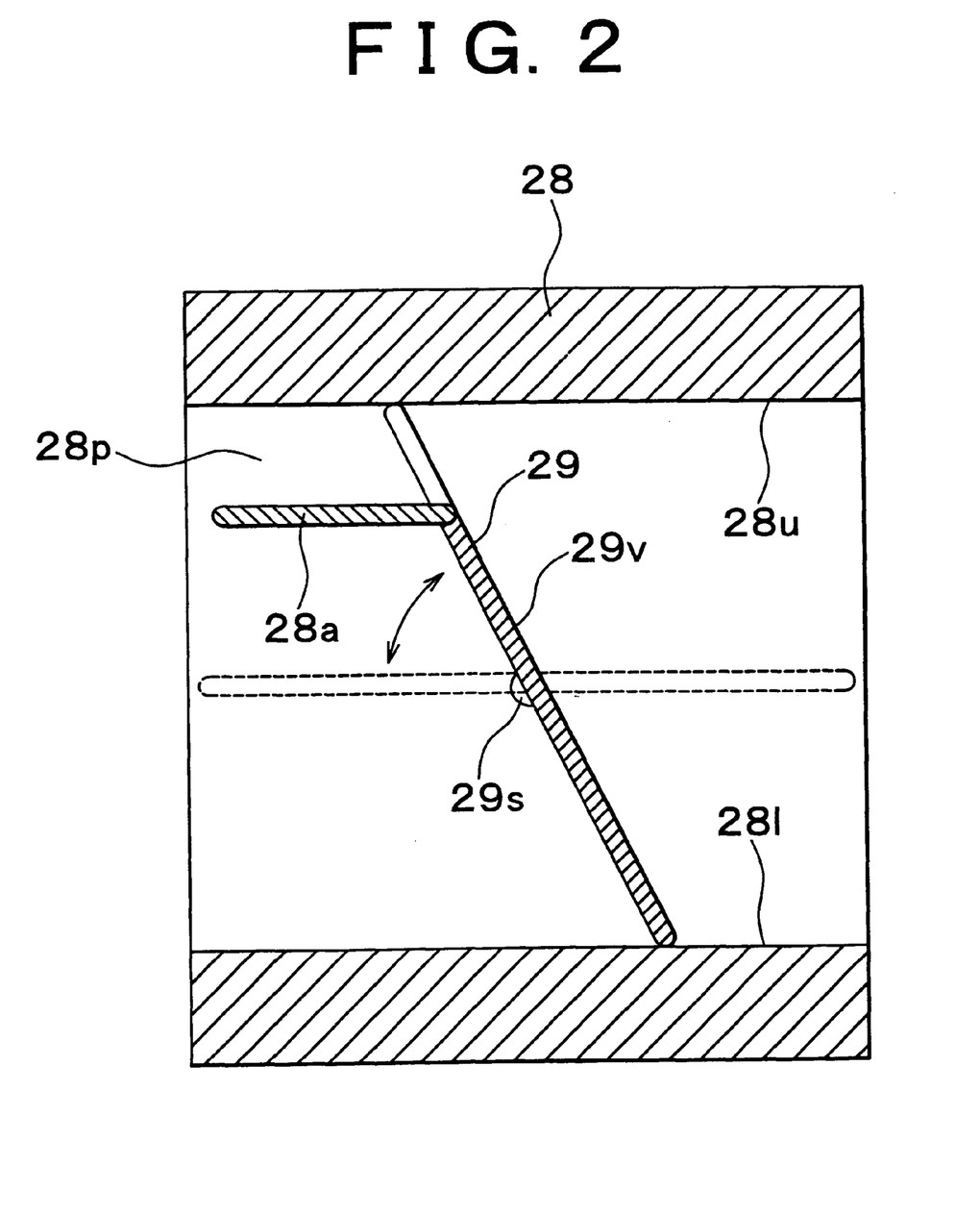
FIG. 2 is a cross-sectional view of an intake flow control valve assembly in the device of FIG. 1.
Figure 3A:
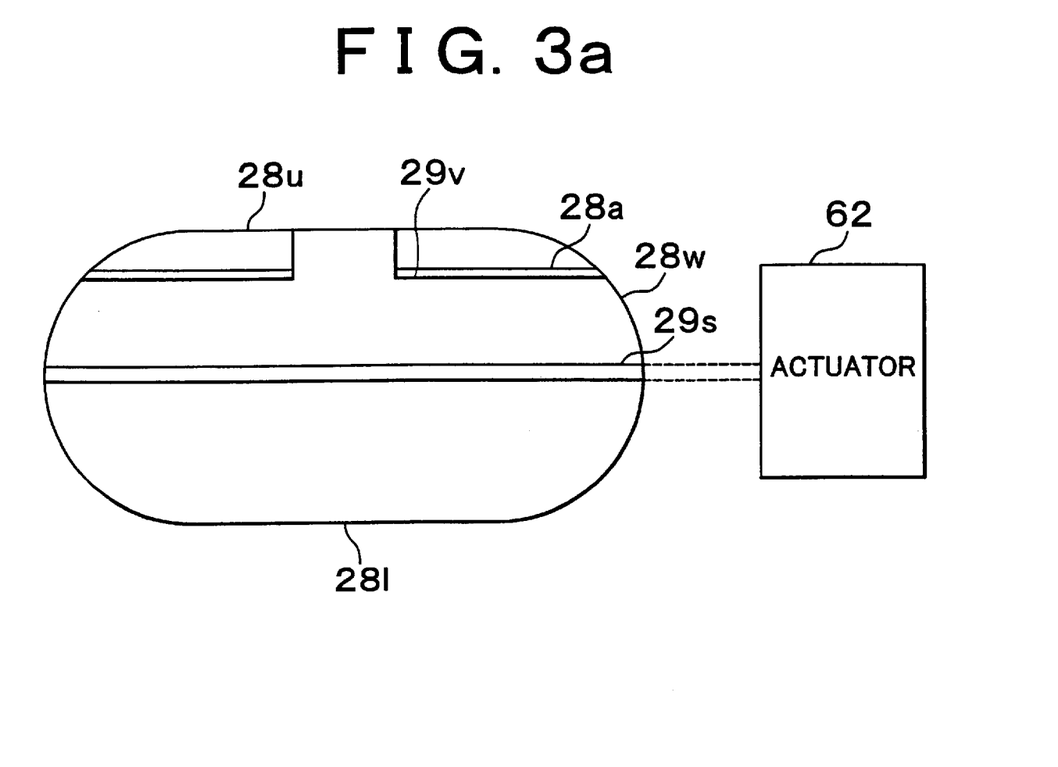
FIG. 3a is a front view of the intake flow control valve of FIG. 2.

FIGS. 2 and 3a illustrate the specific structure of the intake flow control valve 29. FIG. 2 is a side view of the intake flow control valve 29. FIG. 3a is a front view of the intake flow control valve 29 as viewed from the injector 27.

In FIG. 2, a straightening plate 28a extending in parallel with an upper pipe wall 28u is provided downstream of the intake flow control valve 29. When the intake flow control valve 29 is fully closed, the straightening plate 28a contacts the respective upper edges of notches 30. The actuator 62 connected to a shaft 29s drives the shaft 29s to open and close the intake flow control valve 29.

A pipe portion of the valve assembly 28 has an elliptical cross section as shown in FIG. 3a. The intake flow control valve 29 is provided in the pipe portion in a pivotable manner on the shaft 29s.

Figure 3B:
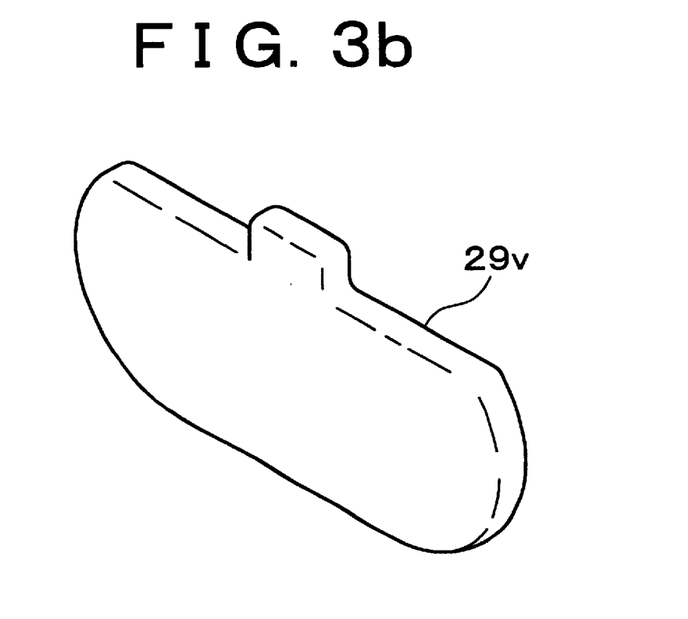
FIG. 3b is a perspective view of a valve body of FIG. 2.

FIG. 3b is a perspective view of a valve body 29v of the intake flow control valve 29.

Figure 4:
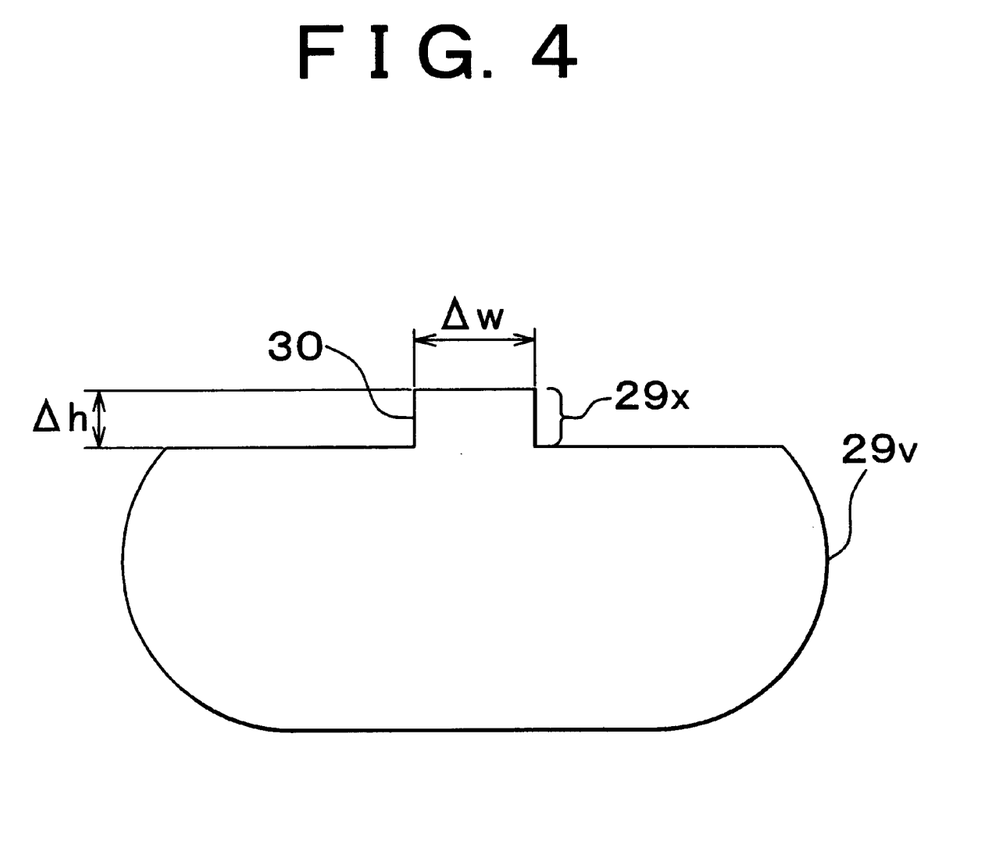
FIG. 4 shows the shape of the valve in FIG. 3.

As shown in FIG. 4, the valve body 29v of the intake flow control valve 29 has notches 30 on both sides of the top of the pipe portion of the valve assembly 28 in oblique cross sectional (elliptical shape). A portion 29x for producing an airflow bypassing the projection (hereinafter, referred to as "bypass airflow producing portion 29x") is formed approximately in the center of the upper part of the valve body 29v. The bypass airflow producing portion 29x has width Δw and height Δh. More specifically, the bypass airflow producing portion 29x is formed at a position corresponding to a projecting position at the tip of the injector 27 as viewed in cross section of the intake pipe 2.

Figure 5:
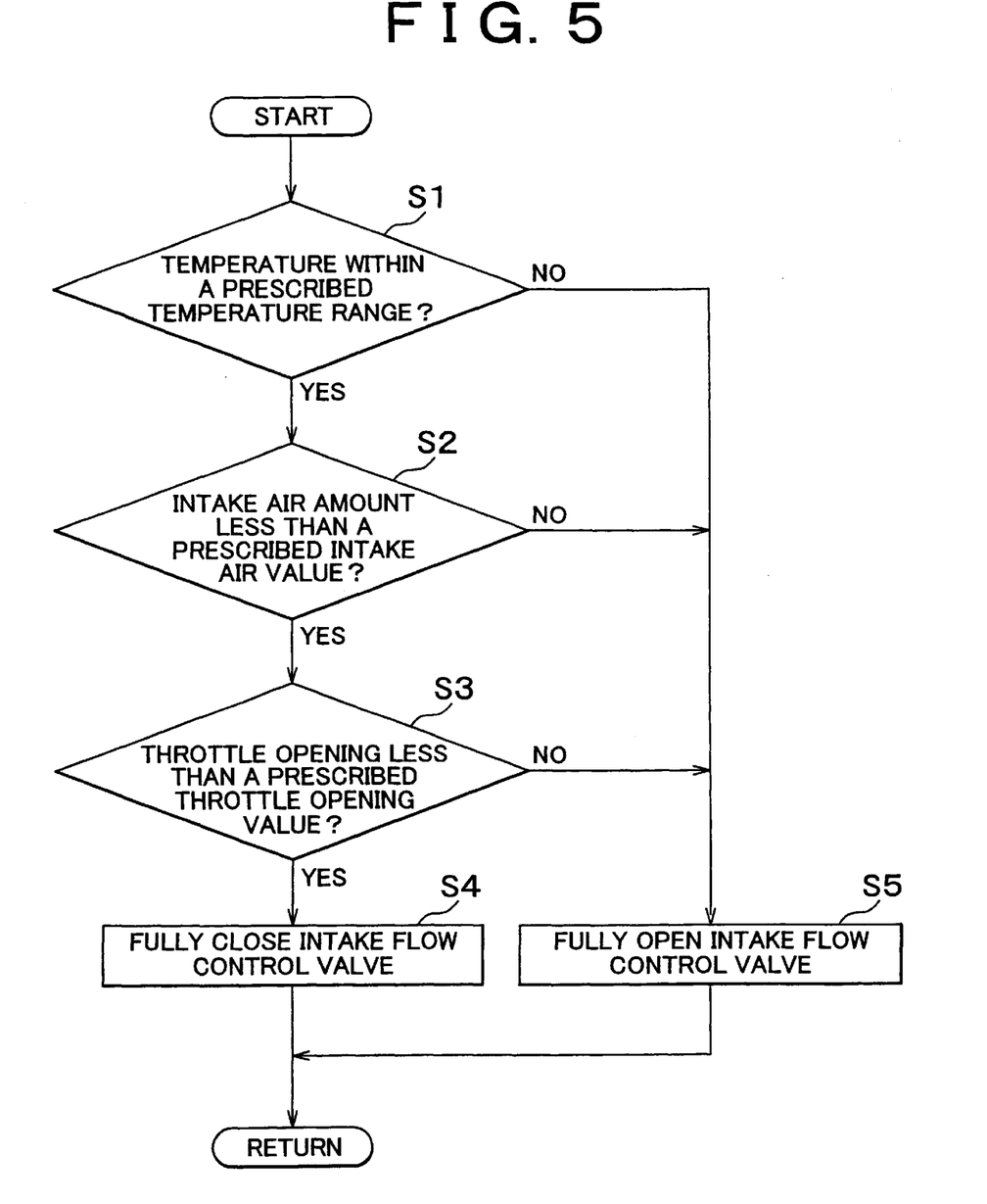
FIG. 5 is a flowchart illustrating operation of an intake flow control valve in the intake device of the internal combustion engine according to the invention.

Hereinafter, operation of the intake device 100 of the internal combustion engine 1 according to the invention will be described. FIG. 5 is a flowchart illustrating the operation of controlling the intake device 100. This control routine is repeatedly performed by the engine ECU 6 at prescribed intervals after the ignition key is turned ON.

In step S1, the temperature of the engine cooling water is determined. It is determined whether the temperature is within a prescribed temperature range. In particular, the prescribed temperature range is a predetermined range lower than a prescribed temperature value. Specifically, the control routine determines whether the temperature of the engine cooling water is low in a fast idle state, other than in a cold environment. If the temperature of the engine cooling water is low (YES in step S1), the control proceeds to step S2. Otherwise, the control routine jumps to step S5.

In step S5, the control routine fully opens the intake flow control valve.

In step S2, the control routine determines whether the intake air amount is less than a prescribed intake air value. If the intake air amount is less than the prescribed intake air value, then the control routine proceeds to step S3. Otherwise, the control routine jumps to step S5. In step S2, if the intake air amount is small, then it is determined that the internal combustion engine 1 is in the idle state, and the control routine proceeds to step S3.

In step S3, the control routine determines whether the throttle opening is less than a prescribed throttle opening value. If the throttle opening is less than the prescribed throttle opening value, the control routine proceeds to step S4. Otherwise, the control routine jumps to step S5. In step S3, if the control routine determines that the throttle opening is less than the prescribed throttle opening value, the internal combustion engine 1 is in the idle state.

In step S4, the actuator 62 is controlled to fully close the intake flow control valve 29. In the fully closed state, the intake flow control valve 29 partially closes the intake pipe 2 within the intake flow control valve assembly 28, as shown by the solid line in FIG. 2. Accordingly, the air flows only through the notches 30. By partially closing the flow plane of the intake pipe 2, a negative pressure is produced downstream of the intake flow control valve 29. As a result, the airflow passing through the notches 30 is accelerated.

Referring to FIG. 2, the airflow passing through the notches 30 is regulated through a flow path 28p between the straightening plate 28a and the upper pipe wall 28u, and then introduced into the intake port 21. In the intake port 21, this airflow is changed into a strong airflow along the upper wall surface. At a position downstream of the intake flow control valve 29, the injector 27 projects into the intake port 21 through the upper wall surface of the cylinder head 13. The bypass airflow producing portion 29x of the intake flow control valve 29 is formed at a position corresponding to the projecting position of the injector 27 in the flow direction of the airflow. Therefore, the airflow formed in the intake port 21 bypasses the projecting portion of the injector 27. This allows the airflow to reach the intake valve 16 and the combustion chamber 14 without being disturbed by a projecting portion 27a of the injector 27 within the intake pipe. As a result, a strong tumble flow is formed within the combustion chamber 14.

In the case of an internal combustion engine including no intake flow control valve, a negative pressure within the intake pipe is small if the wall surface of the intake port is cold as in a fast idle state. Therefore, the fuel injected from the injector is not actively evaporated, increasing the amount of fuel adhering to the internal wall surface of the intake pipe. However, in the internal combustion engine 1 including the intake device 100 according to one embodiment of the invention, the intake flow control valve 29 is capable of increasing the negative pressure within the intake pipe 2. Due to the effect of boiling in a reduced-pressure environment, evaporation of the fuel is facilitated, whereby the amount of fuel adhering to the internal wall surface of the intake pipe 2 can be suppressed.

Moreover, a strong tumble flow within the combustion chamber 14 enables combustion at a leaner air-fuel ratio (A/F). Accordingly, the fuel injection amount can be reduced, allowing stable idling with retarded ignition timing as well as suppression of emission of the unburned fuel.

Referring to FIG. 5, if NO is determined in any of steps S1 to S3, the control routine proceeds to step S5. In step S5, the actuator 62 is driven to fully open the intake flow control valve 29. As a result, normal operation is conducted without conducting the intake flow control. If NO is determined in step S1, the temperature of the engine cooling water is high enough. Therefore, it is determined that the internal combustion engine 1 is not in a fast idle state. Therefore, the fuel hardly adheres to the internal wall surface of the intake pipe 2. Moreover, it can be determined that the temperature of an exhaust gas purifying catalyst is high enough to appropriately purify the unburned fuel. Therefore, degradation in emission can be suppressed. If NO is determined in step S2 or S3, it can be determined that the driver requests an increased amount of intake air. However, the intake flow control valve 29 in the fully closed state cannot increase the intake air amount appropriately. Therefore, the control proceeds to step S5, in which the intake flow control valve 29 is fully opened to increase the intake air amount. The internal combustion engine 1 thus responds to the request from the driver, resulting in improved drivability.

Hereinafter, the relation between the shape of the valve body 29v of the intake flow control valve 29 and the projecting portion 27a of the injector 27 will be described. Preferably, the shape of the valve body 29v of the intake flow control valve 29 is set according to the position and shape of the projecting portion 27a within the intake pipe and the distance to the projecting portion 27a. More specifically, as the projecting position (the distance between the projecting portion 27a and the inlet of the combustion chamber 14) is closer, as the shape of the projecting portion 27a is larger, and as the distance to the control valve is closer, the effect of disturbance in the airflow by the projecting portion 27a is more likely to be brought into the combustion chamber 14. Accordingly, the airflow must be formed so as to bypass the projecting portion 27a within the intake pipe to a large degree. By setting the shape of the valve body 29 according to the position and shape of the projecting portion 27a, an appropriate tumble flow can be formed within the combustion chamber 14. The injector 27, i.e., the projecting portion 27a within the intake pipe, is located in the center of the upper part of the intake pipe 2 when viewed in cross section. Therefore, the valve body 29v preferably has a convex shape having portions at both upper ends removed away. This facilitates manufacturing and assembling of the intake pipe 2 and intake flow control valve 29.

Figure 6:
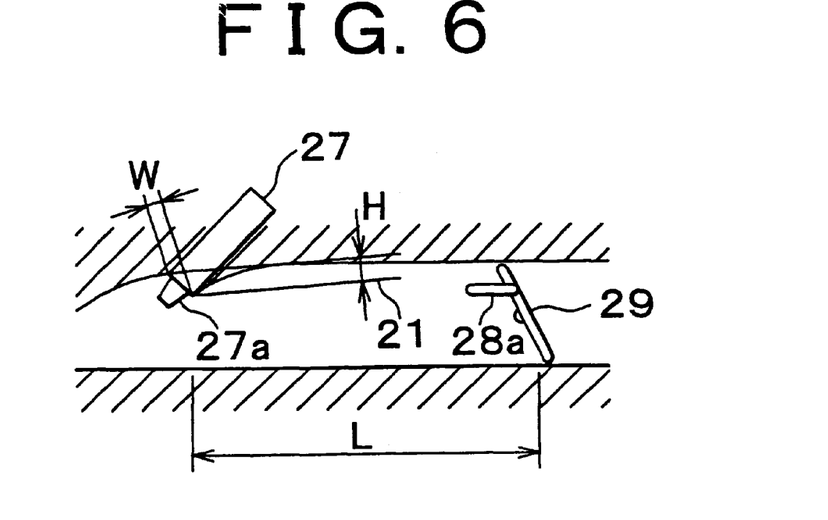
FIG. 6 shows the positional relation among the intake flow control valve, fuel injector and intake valve in the internal combustion engine of FIG. 1.

FIG. 6 is a schematic diagram showing the positional relation between the intake flow control valve 29 and the injector 27 within the intake port 21. As shown in FIG. 6, it is assumed that the projecting portion 27a of the injector 27 has a height H from the wall surface and a width W, and the intake port 21 has a length L between the projecting portion 27a of the injector 27 and the intake flow control valve 29.

As the width W and height H are increased, the airflow formed by the intake flow control valve 20 is required to bypass the projecting portion 27a of the injector 27 to a larger degree. Accordingly, the bypass airflow producing portion 29x formed at the upper part of the valve body 29v of the intake flow control valve 29 must have a greater width Δw as the width W is increased, and must have a greater height Δh as the height H is increased (see, e.g., FIG. 4). However, it is preferable that Δw<W and Δh<H in terms of the projected area in the cross section of the intake port 21. More specifically, it is preferable that the projected area of the bypass airflow producing portion 29x is smaller than that of the projecting portion 27a of the injector 27. Moreover, as the length L is shorter, the airflow formed by the intake flow control valve 29 must bypass the projecting portion 27a of the injector 27 to a larger degree. Accordingly, as the length L is shorter, the bypass airflow producing portion 29x of the intake flow control valve 29 must have a greater width Δw and height Δh. Note that in order to increase the flow rate of the air through the notches 30 in the fully closed state of the intake flow control valve 29, it is preferable to increase the height Δh of the bypass airflow producing portion 29x than to reduce the width Δw thereof.

The outer edge of the valve body 29v is preferably formed from smooth connection of a straight edge and a curved edge. This prevents separation of the airflow passing through the intake flow control valve 29, allowing formation of a relatively strong tumble flow within the combustion chamber 14. As a result, combustion is further improved.

Figure 7:
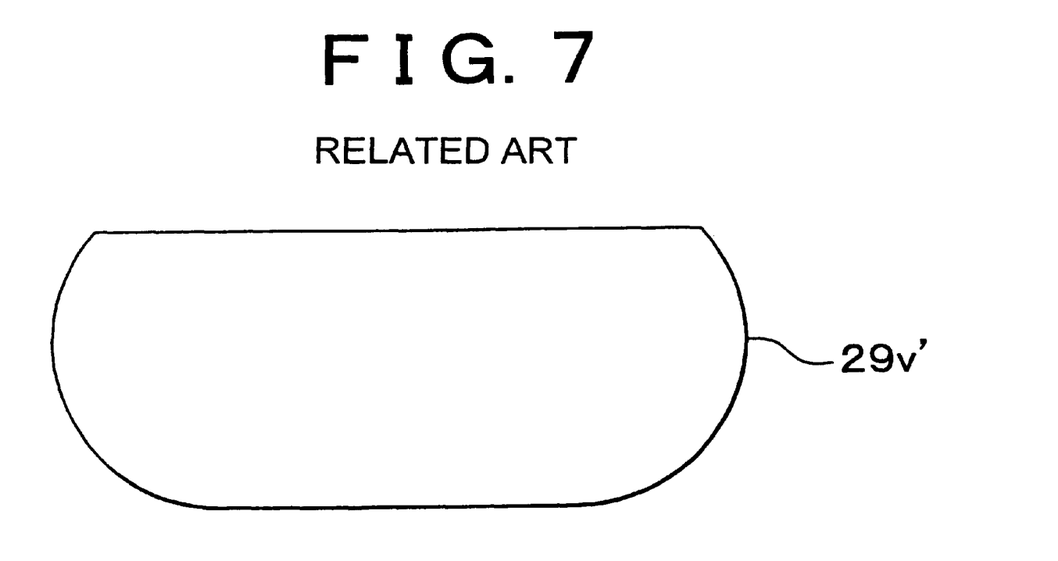
FIG. 7 shows an intake flow control valve of the related art.
Figure 8:
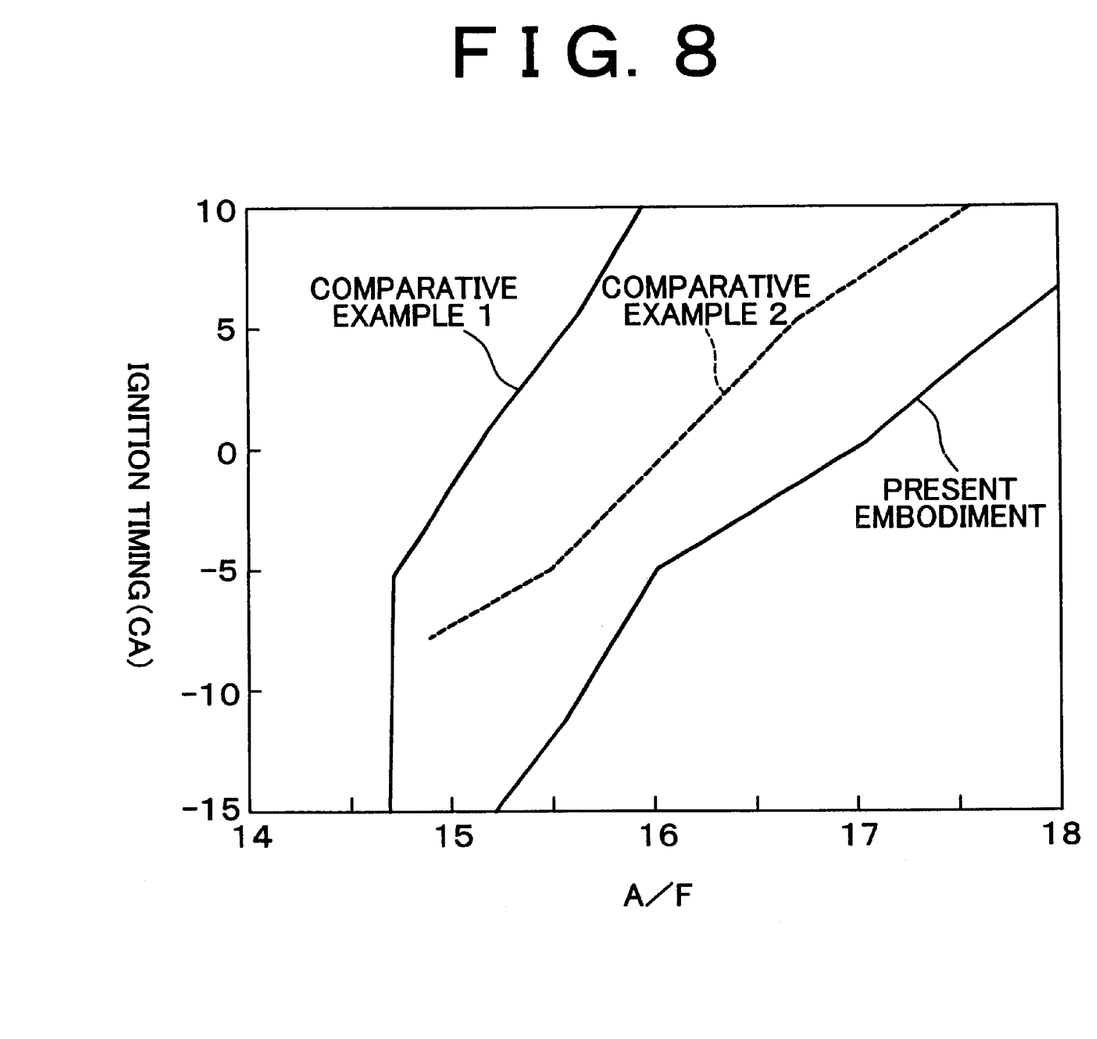
FIG. 8 is a graph showing the comparison of improvement in combustion between the intake device of the internal combustion engine of the invention and the related art.

The inventors conducted experimentation in order to confirm improvement in combustion achieved by the intake device 100 of the internal combustion engine 1 of the invention. The comparison result will be described below. In the experimentation, the following three samples were compared: an embodiment using the intake flow control valve 29 according to the present invention and shaped as shown in FIG. 3b; comparative example 1 including no intake flow control valve; and comparative example 2 using a conventional intake flow control valve 29v' as disclosed in Japanese Patent Application Laid-Open No. 11-257078 shown in FIG. 7. For the above three samples, the lean limit capable of causing combustion was examined by adjusting the injection timing. The result is shown in FIG. 8. The present embodiment and the comparative example 2 were both shaped so that the area of the flow path in the closed state is equal to 10% of the area of the entire flow path. Note that FIG. 8 shows an equal torque variation line indicating the lean limit, where the ordinate indicates the ignition timing, and the abscissa indicates the air-fuel ratio (A/F).

As shown in FIG. 8, the comparative example 2 is capable of leaner combustion as compared to the comparative example 1. In other words, combustion is improved in the comparative example 2 over the comparative example 1. However, combustion is less improved at the normal ignition timing. In contrast, the present embodiment is capable of leaner combustion at any ignition timing as compared to the comparative examples 1, 2. Thus, improvement in combustion was confirmed.

Figure 9A:
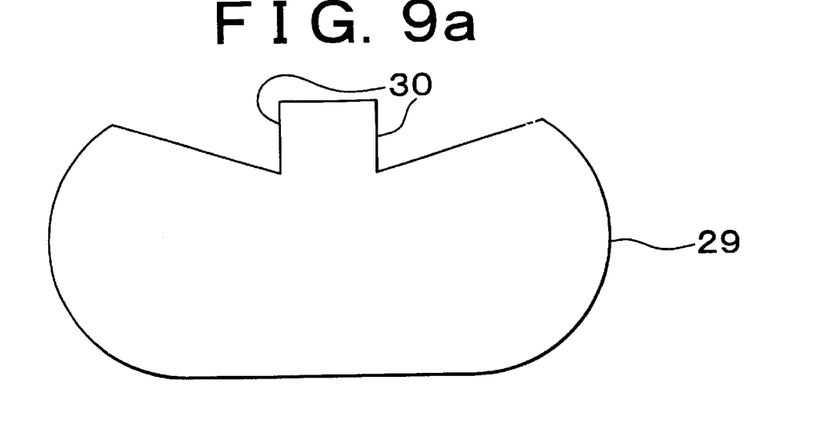
FIGS. 9a to 9c show other embodiments of the intake flow control valve in the intake device of the internal combustion engine according to the invention.
Figure 9B:
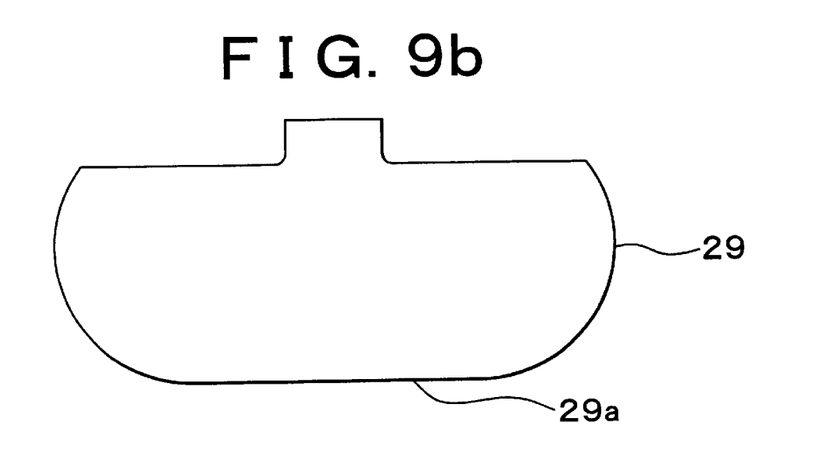
Figure 9C:
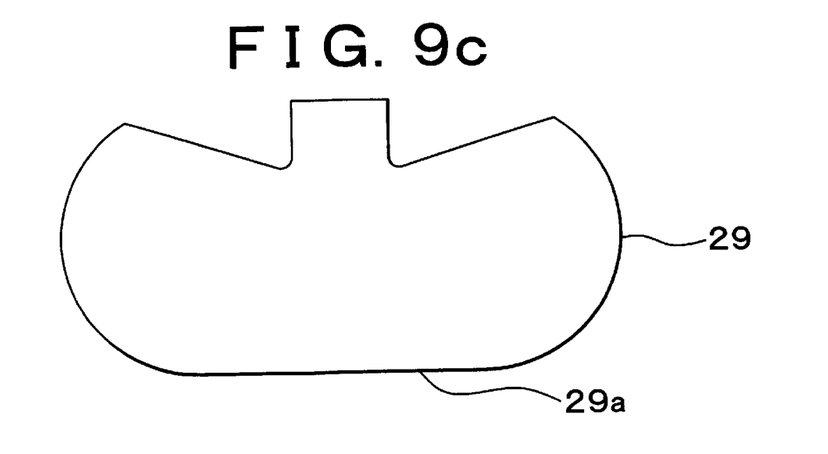

The shape of the valve body 29v of the intake flow control valve 29 of the internal combustion engine 1 of the invention is not limited to that of FIG. 3b. As shown in FIG. 9a, the notches 30 may be formed deeply at the bottom of the bypass airflow producing portion 29x in order to assure the opening area. Alternatively, as shown in FIGS. 9b and 9c, the outer edge 29a of the valve body 29v may be formed from a straight edge and a curved edge. In this case, the air passing through the intake flow control valve 29 is less likely to be separated at the edge of the valve body 29v, whereby a relatively strong tumble flow can be formed.

In the foregoing description, part of the injector 27 serves as a projecting portion 27a. However, the same applies to another type of projection. Moreover, in the foregoing description, the intake flow control valve 29 is independent of an intake manifold. However, the intake flow control valve 29 may be incorporated into an integral intake manifold.

As has been described above, according to the invention, even if a projection portion 27a such as injection nozzle of the injector 27 is present within the intake pipe, the tumble flow formed by the intake flow control valve 29 is introduced into the combustion chamber 14 without being weakened or disturbed by that projection portion 27a. As a result, great improvement in combustion can be realized.

In the illustrated embodiment, the controller (the ECU 6) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An intake device of an internal combustion engine, comprising:

a throttle valve provided within an intake pipe;

a projection within the intake pipe located downstream of the throttle valve; and an intake valve provided between the throttle valve and the projection within the intake pipe that produces a tumble flow in a combustion chamber, wherein:

the intake valve is shaped so that an airflow, formed by the intake valve, bypasses the projection located downstream of the intake valve, and a projected area of the bypass located on a valve body of the intake valve as viewed in the flow direction of the airflow in the intake pipe is smaller than a projected area of the projection as viewed in the flow direction of the airflow in the intake pipe.

2. The intake device according to claim 1, wherein the shape of the intake valve is set according to a position and shape of the projection within the intake pipe and a distance from the projection to the intake valve.

3. The intake device according to claim 1, wherein the projection within the intake pipe is located in a center of a top of the intake pipe in cross section, and the intake valve has a convex shape having portions removed at both upper side ends of the intake valve.

4. The intake device according to claim 1, wherein an outer edge of the intake valve is formed from a smooth connection of a straight edge and a curved edge.

5. An intake device of an internal combustion engine, comprising:

an intake pipe that passes an airflow therethrough into the internal combustion engine;

a throttle valve provided within the intake pipe;

a projection within the intake pipe located downstream of the throttle valve; and an intake valve provided between the throttle valve and the projection within the intake pipe, wherein:

a lower portion of a valve body of the intake valve is shaped so as to correspond to an oblique cross-sectional shape of the intake pipe, and an upper portion of the valve body has notches; and a bypass is located on said valve body corresponding to a position of the projection when viewed in a flow direction of the airflow in the intake pipe, wherein the bypass causes the airflow passing through the intake valve to bypass the projection, and a projected area of the bypass as viewed in the flow direction of the airflow in the intake pipe is smaller than a projected area of the projection as viewed in the flow direction of the airflow in the intake pipe.

6. The intake device according to claim 5, wherein a width of the bypass is variably set in proportion to a width of the projection as viewed from the flow direction of the airflow in the intake pipe.

7. The intake device according to claim 5, wherein the bypass is sized in inverse proportion to a distance between the projection within the intake pipe and the intake valve.

8. The intake device according to claim 5, further comprising a combustion chamber provided downstream of the projection, wherein the bypass is sized in inverse proportion to a distance between the projection within the intake pipe and the combustion chamber.

9. The intake device according to claim 5, wherein an outer edge of the valve body is formed from a smooth connection of a straight edge and a curved edge.

10. The intake device according to claim 5, further comprising a straightening plate provided within the intake pipe, the straightening plate extending in the flow direction of the airflow, and abutting respective horizontal ends of the notches of the valve body when the intake valve is in a fully closed state.

11. The intake device according to claim 10, wherein an outer edge of the straightening plate is formed from a smooth connection of a straight edge and a curved edge.

12. A method for controlling an airflow into an internal combustion engine having an intake device including a throttle valve provided within an intake pipe; a projection within the intake pipe located downstream of the throttle valve; and an intake valve provided between the throttle valve and the projection within the intake pipe, the method comprising:

producing a tumble flow in a combustion chamber with the intake valve; and shaping the intake valve such that an airflow across the intake valve bypasses the projection located downstream of the intake valve, wherein the shape of the intake valve is set according to a position and shape of the projection and a distance from the projection to the intake valve.

* * * * *